United States Patent [19]
Marshall

[11] 3,891,290
[45] June 24, 1975

[54] WASHER FOR ELECTRICALLY CONNECTING THE TUBES OF A FLUID LINE

[75] Inventor: Tommy G. Marshall, Florissant, Mo.

[73] Assignee: McDonnell Douglas Corporation, St. Louis, Mo.

[22] Filed: Oct. 15, 1973

[21] Appl. No.: 406,540

[52] U.S. Cl. .................. 339/15; 174/78; 174/94 S; 339/117 R
[51] Int. Cl. ...................... H01r 3/04; H02g 15/08
[58] Field of Search....... 174/86, 69, 51, 84 S, 94 S, 174/78; 339/15, 16, 14 R, 5, 8, 9, 89, 117 R; 317/2 R, 2 J

[56] References Cited
UNITED STATES PATENTS

| 2,477,901 | 8/1949 | Robboy | 174/86 |
| 2,533,097 | 12/1950 | Dale | 174/86 UR |
| 3,339,168 | 8/1967 | Belicka et al. | 339/15 X |
| 3,402,253 | 9/1968 | McCracken | 174/86 |
| 3,753,205 | 8/1973 | Tuger | 174/78 X |
| 3,782,401 | 1/1974 | Moore et al. | 174/84 S X |

*Primary Examiner*—Darrell L. Clay
*Attorney, Agent, or Firm*—Gravely, Lieder & Woodruff

[57] ABSTRACT

A fluid line has tubes set end-to-end and connected together by couplings in which resilient electrically conductive devices are fitted. Each conductive device is between the ends of two adjoining tubes and has lobes which engage the ends of those tubes so as to establish and maintain a good electrical connection between the adjoining tube ends. Each conductive device has axially extending tabs which fit into one of the tubes to hold the device in place during assembly of the coupling.

9 Claims, 4 Drawing Figures

PATENTED JUN 24 1975  3,891,290

3,891,290

WASHER FOR ELECTRICALLY CONNECTING THE TUBES OF A FLUID LINE

BACKGROUND OF THE INVENTION

This invention relates in general to fluid lines, and more particularly to a coupling and conductive device for joining the individual tubes of fluid lines.

The fuel lines of most aircraft are composed of individual tubes set end-to-end and joined together by couplings which permit some flexing of the tubes at the joints. The couplings normally contain elastomeric O-rings which electrically isolate the individual tubes from one another. This disruption in electrical continuity is undesirable because it can result in one tube assuming a different potential than its adjoining tube. In particular, as the fuel flows through the line electrical static charges build up in the moving fuel and the individual tubes assume the potential of fuel within them unless grounded. This is known as triboelectric charging. The potential difference between adjacent tubes can become so great that arcing may occur, and this, of course, could ignite the fuel. To avoid this problem, conventional fuel lines are provided with electrical jumpers which bridge the couplings externally of the line and are secured to the tubes by clamps located adjacent the couplings. These jumpers place all of the individual tubes at the same potential and help dissipate triboelectric charging.

The jumpers and clamps, while not being difficult to install, nevertheless add steps and considerable time to the assembly procedure. In this connection, it should be noted that the tubes must be cleaned externally, then the clamps applied around the cleaned portions, and finally the jumper connected between the clamps and a protective coating applied to the clamp line area that was cleaned. The clamps and jumpers are also exposed outwardly where they increase the overall size of the fuel line and where the jumper can be inadvertently severed. Moreover, the use of jumpers requires an inventory of several parts.

SUMMARY OF THE INVENTION

One of the principal objects of the present invention is to provide a washer for establishing electrical continuity between adjacent tubes of a fuel line. Another object is to provide a connector washer of the type stated which is located within the coupling where it is protected and does not increase the overall size of the fuel line. A further object is to provide a washer of the type stated which is easily installed. Still another object is to provide a fuel line having the individual tubes thereof electrically connected by a washer of the type stated. These and other objects and advantages will become apparent hereinafter.

The present invention is embodied in a washer configured to be positioned between the ends of adjacent tubes in a fluid line. It also includes the fuel line having the washer therein. The invention also consists in the parts and in the arrangements and combinations of parts hereinafter described and claimed.

DESCRIPTION OF THE DRAWINGS

In the accompanying drawings which form part of the specification and wherein like numerals and letters refer to like parts wherever they occur

DETAILED DESCRIPTION

Figure 1:
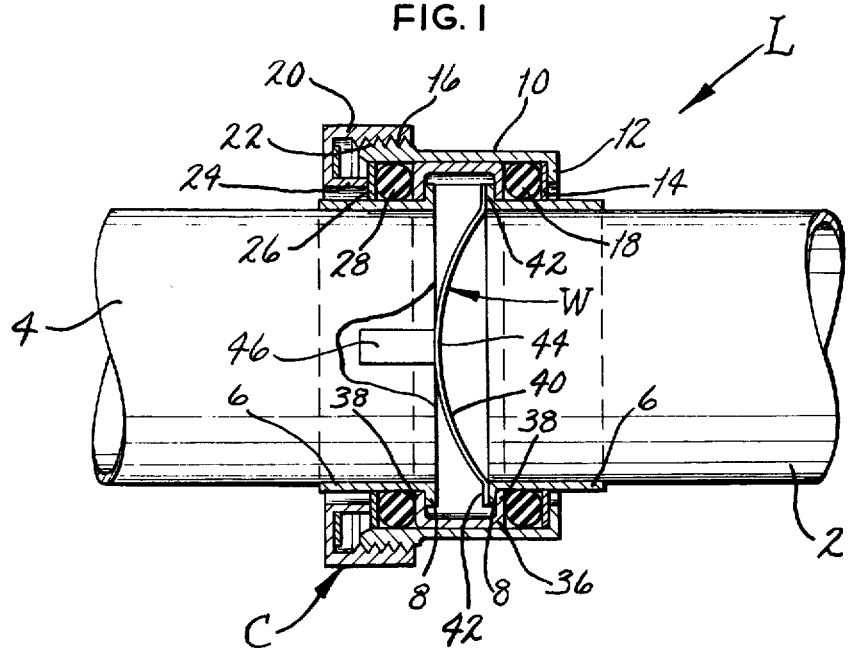
FIG. 1 is a sectional view of a fuel line having a washer between the ends of the individual tubes thereof for electrically connecting the tubes.
Figure 2:
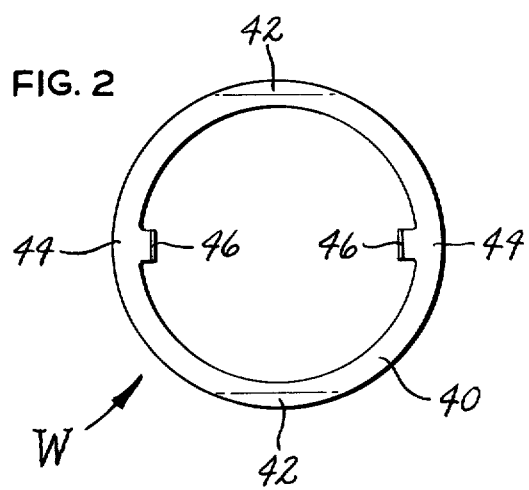
FIG. 2 is a front elevational view of the washer.

Referring now to the drawings (FIG. 1), L designates a fuel line including tubes 2 and 4 which are joined end-to-end by a coupling C. Located entirely within the coupling C and interposed between the ends of the tubes 2 and 4 is an axially compressible conductive device or washer W which contacts the ends of both of the tubes 2 and 4 to electrically connect those tubes. Thus, both tubes 2 and 4 will be at the same electrical potential when fuel flows through them.

The tubes 2 and 4 are flanged at their ends (FIG. 1), and this is preferably achieved by swaging or brazing ferrules 6 over the ends of the tubes 2 and 4. The ferrules 6 have outwardly turned flanges 8 at their ends, and the flanges 8 of the two ferrules 6 face one another and form the extremities of the tubes 2 and 4.

The ferrule 6 on the tube 2 is surrounded by a male coupling element 10 (FIG. 1) having an inwardly disposed portion or shoulder 12 presented toward the back side of the flange 8 on that ferrule 6 and a backing ring 14 against the shoulder 12. The coupling element 10 furthermore projects axially beyond the flange 8 for the tube 2 and also beyond the flange 8 for the tube 4, and this axially projecting portion has external threads 16. The backing ring 14 bears against an elastomeric O-ring 18 which creates a fluid-tight seal between the coupling element 10 and the tube 2.

Surrounding the ferrule 6 on the other tube 4 is a female coupling element 20 (FIG. 1) having internal threads 22 which mate with the threads 14 on the male element 10, so that the female element 20 threads over the male element 10. The female element 20 also has an inwardly disposed sleeve-like portion 24 which is smaller in diameter than the inside of the male element 10, yet is larger in diameter than the main body of the ferrule 6 on the tube 4. The end of the sleeve-like portion 24 bears against a backing ring 26 which in turn bears against another elastomeric O-ring 28. The O-ring 28 is actually disposed within the male coupling element 10 and forms a fluidtight seal between the element 10 and the tube 4.

Fitted around the flanges 8 on the ferrules 6 of the tubes 2 and 4 is a split collar 36 (FIG. 1) having inwardly directed flanges 38 which are disposed behind the flanges 8 on the ferrules 6 where the O-rings 16 and 26 bear against them. The collar 36 is formed from a resilient metal and is split in the axial direction so that it can be enlarged during assembly to receive the flanges 8 on the ferrules 6.

When the female element 20 is tightened over the male element 10, the O-ring 18 is compressed between the backing ring 16 and one flange 38 of the collar 36. Likewise, the O-ring 28 is compressed between the backing ring 26 and the other flange 38. This axial compression of the O-rings 18 and 28 tends to spread them in the radial direction and form a seal between the inside surface of the male coupling element 10 and the outside-surfaces of the ferrules 6.

Due to the presence of the O-ring 18 between the tube 2 and its coupling element 10 and the presence of the O-ring 28 between the tube 4 and its coupling element 20, one cannot be assured of obtaining electrical continuity between the tubes 2 and 4 through the coupling C. Indeed, more likely than not the O-rings 18 and 28 will electrically isolate the coupling C from the tubes 2 and 4. The split collar 36 cannot be relied upon to provide good electrical contact since the flanges 8 on the ferrules 6 can move away from the flanges 38 on the collar 36 when the tubes 2 and 4 expand or flex relative to each other. The washer W, however, contacts the flanges 8 at the ends of both tubes 2 and 4 and remains in contact with them as the tubes 2 and 4 expand and contact 2 and 4 so that the tubes 2 and 4 are electrically connected through the washer W at all times.

Figure 3:
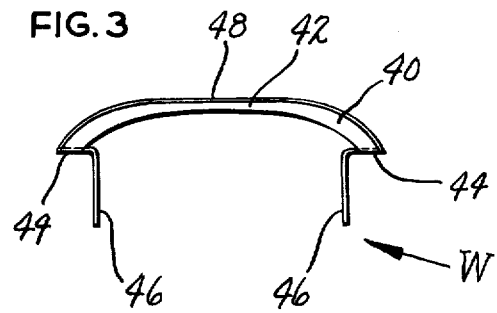
FIG. 3 is a top plan view of the washer when slightly compressed in the axial direction.
Figure 4:
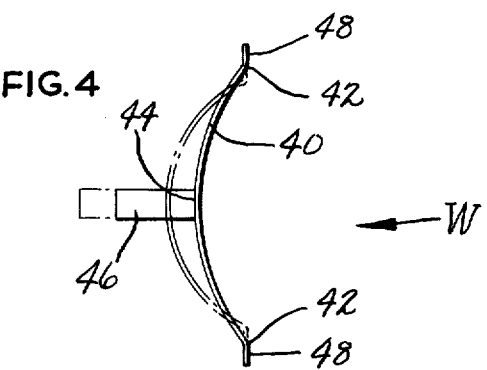
FIG. 4 is a side elevation view of the washer showing the washer slightly compressed (full lines) and also undistorted/free state (broken lines).

The washer W (FIGS. 1-4) is formed from a suitable metal, and preferably from a copper beryllium alloy plated with tin. The washer W has an annular portion 40, the outside diameter of which is such that it fits within the collar 36 with a slight clearance. Hence, the collar 36 confines the washer W in the radial direction. The inside diameter of the annular portion 40 is such that it will not impede the passage of fuel through the coupling C. Moreover, the annular portion 40 is undulated or wave shaped (FIGS. 3 & 4) so that it has alternate lobes 42 and 44 with the lobes 42 projecting in one axial direction and the lobes 44 in the other axial direction. The washer W contacts the flanges 8 of the tubes 2 and 4 along the lobes 42 and 44, respectively, of its annular portion 40. Preferably, the annular portion 40 possesses four lobes, that is, two lobes 42 and two lobes 44, with alternate lobes 42 and 44 being spaced 90° from each other in the circumferential direction. At the lobes 42, retaining tabs 46, which are formed integral with the annular portion 40, project in the same axial direction as the lobes 44. The tabs 46 are set slightly inwardly from the inner margin of the annular portion 40 and are spaced apart sufficiently to enable them to fit snugly into the end of the tube 2 to hold the washer W in place during assembly of the coupling C. When the washer W is so positioned, the lobes 42 will be against the end of the flange 8 on the tube 2. Along the lobes 44, the annular portion 40 is provided with generally flat faces 48 which abut against the end of the flange 8 on the tube 4.

Being formed from resilient electrically conductive material, such as spring metal, the annular portion 40 of the washer W will compress or tend to flatten as the coupling sleeve 40 is tightened over the male coupling element 10, and as a result the lobes 42 and 44 will be urged snugly against the flanges 8 for the tubes 2 and 4, respectively, so that good electrical contact is maintained. This insures that the tube 2 is at the same electrical potential as the tube 4. The compression of the annular portion 40 furthermore enables the electrical contact to remain effective even when the tubes 2 and 4 flex slightly with respect to each other at the coupling C or when they expand and contract.

The undulated configuration of the annular portion 40 and the material from which that portion is formed should be such that the annular portion 40 will not take on a permanent set when completely flattened. In other words, the annular portion 40 can be completely flattened between the flanges 8 of the tubes 2 and 4 and yet will spring back to its original shape when the tubes 2 and 4 are withdrawn from each other. When the washer W is not compressed the distance between the lobes 42 and 44, measured axially should exceed the maximum distance between the flanges 8 in the collar 36.

To connect the tubes 2 and 4 by means of the coupling C, first the male coupling element 10 is fitted over the tube 2 and the female coupling element 20 over the tube 4. The ferrules 6 are then swaged or otherwise secured to the ends of the tubes 2 and 4. Thereafter, the O-rings 18 and 28 are installed on the ferrules 6 for the tubes 2 and 4, respectively, away from the flanges 8 thereon. Next, the washer W is installed on the tube 2 by inserting the retaining tabs 46 thereof into the interior of the tube 2. This holds the washer W in place during subsequent assembly steps. Once the washer W is in place, the tubes 2 and 4 are positioned end-to-end and the split collar 36 is expanded to enable its inwardly directed flanges 38 to pass over the flanges 8 on both tubes 2 and 4. After the expanding force is released and the collar 36 contracts, the flanges 38 thereon will interlock with the flanges 8 on the ends of the tubes 2 and 4 to prevent the tubes from being withdrawn from each other. Finally, the coupling sleeve 30 of the female element 20 is threaded over the threads 14 of the male element to secure the coupling C and effect the electrical continuity between the tubes 2 and 4.

This invention is intended to cover all changes and modifications of the example of the invention herein chosen for purposes of the disclosure which do not constitute departures from the spirit and scope of the invention.

What is claimed is:

1. In a fluid carrying line including first and second tubes joined by a coupling, a washer electrically connecting the tubes, said washer comprising: an annular portion formed from a resilient metal and being undulated in the circumferential direction so as to have lobes, the annular portion being located between the ends of the tubes with the lobes contacting the ends of the tubes, the area of contact with the first tube being spaced in the circumferential direction from the area of contact with the second tube, the annular portion being spaced axially from the second tube where it contacts the first tube and being spaced axially from the first tube where it contacts the second tube, and axially directed tabs connected to the annular portion and extending along the first tube to hold the washer in place in the radial direction.

2. The structure according to claim 1, wherein the tabs project in the same axial direction and fit into the first tube.

3. The structure according to claim 2 wherein the tabs are attached to the annular portion at the lobes thereon.

4. The structure according to claim 3 wherein the annular portion at some of the lobes is flattened.

5. The structure according to claim 4 wherein the lobes which contact the end of the second tube are flattened.

6. In a fluid line for carrying a flammable fluid and including first and second metal tubes of circular cross-section having outwardly directed flanges at their ends, a coupling arrangement connecting the tubes at their ends, said coupling arrangement comprising: a collar bridging the ends of the tubes and having inwardly directed first and second flanges which extend behind the outwardly directed flanges on the ends of the first and second tubes, respectively, and prevent the tubes from being withdrawn from each other, the collar being split so that it can be expanded and emplaced over the flanges at the ends of the tubes; first and second annular elastomeric seals encircling the first and second tubes, respectively, behind the flanges on the collar; a first coupling element extended over the collar and having an inwardly disposed portion located behind the first seal with the first seal being between the first flange of the collar and the inwardly disposed portion of the first coupling element; a second coupling element having an inwardly disposed portion located behind the second seal element with the second seal element being disposed between the second flange of the collar and the inwardly disposed portion of the second coupling element, the coupling elements being threaded together with the axial spacing between the inwardly disposed portions of the coupling elements being decreased compressing the seal elements in the axial direction between the flanges of the collar and the inwardly disposed portions of the coupling elements; and a washer located within the collar, the washer being formed from a resilient electrically conductive material and being undulated, forming lobes, the lobes on the washer being in contact with the flanges on the ends of the tube electrically connecting the tubes.

7. The structure according to claim 6, wherein four lobes are provided on the annular portion with the lobes being spaced substantially 90° apart and alternate lobes projecting in opposite axial directions to engage the ends of the tubes.

8. The structure according to claim 6 wherein the washer has tabs which project into one of the tubes and maintain the washer in place during the installation of the collar.

9. The structure according to claim 6 wherein the collar is snugly received in the first coupling element so that it cannot be expanded while in the first coupling element.

\* \* \* \* \*